(12) United States Patent
Racz et al.

(10) Patent No.: US 8,369,221 B2
(45) Date of Patent: Feb. 5, 2013

(54) EFFICIENT FLOW CONTROL IN A RADIO NETWORK CONTROLLER (RNC)

(75) Inventors: Sandor Racz, Cegled (HU); Zoltan C. Nagy, Szeged (HU); Szilveszter Nadas, Budapest (HU); Peter Lundh, Skarholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 12/740,499

(22) PCT Filed: Oct. 29, 2008

(86) PCT No.: PCT/SE2008/051233
§ 371 (c)(1),
(2), (4) Date: Apr. 29, 2010

(87) PCT Pub. No.: WO2009/058085
PCT Pub. Date: May 7, 2009

(65) Prior Publication Data
US 2010/0238803 A1     Sep. 23, 2010

Related U.S. Application Data

(60) Provisional application No. 60/984,443, filed on Nov. 1, 2007.

(51) Int. Cl.
*H04J 1/16* (2006.01)
(52) U.S. Cl. .......................... 370/235; 370/338
(58) Field of Classification Search .................. 370/216, 370/230–235, 241–253, 310–350
See application file for complete search history.

(56) References Cited

U.S. PATENT DOCUMENTS

| | | | |
|---|---|---|---|
| 7,035,214 B1* | 4/2006 | Seddigh et al. | 370/231 |
| 2002/0004389 A1 | 1/2002 | Yi et al. | |
| 2004/0120306 A1 | 6/2004 | Wigard et al. | |
| 2005/0088972 A1* | 4/2005 | Zhang et al. | 370/235 |
| 2006/0268689 A1* | 11/2006 | Tarraf et al. | 370/229 |
| 2007/0127522 A1* | 6/2007 | Lundh et al. | 370/468 |
| 2009/0034474 A1* | 2/2009 | Yavuz et al. | 370/331 |

FOREIGN PATENT DOCUMENTS

| | | |
|---|---|---|
| EP | 1511214 A2 | 3/2005 |
| WO | 03/049320 A1 | 6/2003 |

* cited by examiner

*Primary Examiner* — Ricky Ngo
*Assistant Examiner* — Kan Yuen
(74) *Attorney, Agent, or Firm* — Coats & Bennett, P.L.L.C.

(57) ABSTRACT

A mechanism is provided to resolve the Iub transport network congestion efficiently for HSDPA by dynamic adjustment of the transmit window of the RLC. The RLC protocol is extended with congestion control functionality. The Iub TN and Uu congestion detection method in the Node-B (120) signals the congestion to the RNC (110), and this congestion indication is used by RLC to react on the congestion situation. In the RNC (110), the transmission window of the RLC is adjusted to control the flow rate. When congestion is detected, the RLC transmission window size is decreased. When there is no congestion, then the RLC transmission window size is increased automatically. Different types of congestion are distinguished and are handled in different ways. Alternatively, congestion control is achieved without any modification in the RLC layer from the existing standard. Here, RLC STATUS PDUs are used to change the RLC transmission window size.

10 Claims, 14 Drawing Sheets

EFFICIENT FLOW CONTROL IN A RADIO NETWORK CONTROLLER (RNC)

TECHNICAL FIELD

The disclosed technology relates to promoting efficient flow control for high speed downlink packet access (HSDPA) in a wireless network.

BACKGROUND

As the demand grows for higher throughput, i.e., higher bit rate, and more efficient transmission of packet data over wireless networks, the 3rd Generation Partnership Project (3GPP) has extended its specifications with the High Speed Downlink Packet Access (HSDPA). In HSDPA, a new shared downlink transport channel, called High-Speed Downlink Shared Channel (HS-DSCH), is introduced. This channel is dynamically shared the among packet data users, primarily in the time domain. The application of shared channel makes the use of available radio resources more efficient. The HSDPA also supports new features that rely on the rapid adaptation of transmission parameters to instantaneous radio conditions, also referred to as the Adaptive Modulation and Coding (AMC). The main features of the HSDPA include fast link adaptation, fast Hybrid-ARQ (HARQ—Automatic Repeat Request), and fast channel-dependent scheduling.

Prior to the advent of the HSDPA, transport channels were terminated at the radio network controller (RNC) in wireless networks such as Release '99 networks. This meant that functionalities such as retransmission of packet data, to serve ARQ for example, was located in the RNC. With the advent of the HSDPA, wireless networks such as UMTS (Universal Mobile Telephone System) Terrestrial Radio Access Network (UTRAN), the control of radio frame scheduling is moved from the RNC to the Node-B, i.e., to the base station. In this manner, transmissions and retransmissions of packet data can be directly controlled by the Node-B, which leads to faster retransmissions. This in turn leads to shorter delays and better throughput.

FIG. 1 illustrates an example UTRAN system 100. The system 100 includes an RNC 110 communicating with the core network (not illustrated) over an Iu interface. The system also includes multiple radio base stations also known as Node-Bs 120 connected to the RNC 110 over an Iub interface. The user equipments (UE) 130, typically mobile terminals, communicate with one or more Node-Bs 120 over a Uu interface (radio link). The Iub interface between the Node-B 120 and the RNC 110 has a flow control (FC) mechanism to ensure that the buffers in the Node-B 120 are used properly and to prevent data loss due to buffer overflow.

In UTRAN, fixed capacity (e.g. 64 kbps) can be reserved for traditional Dedicated Channel (DCH) traffic in the access network. However, for HSDPA, per flow bandwidth reservation is not efficient since the Uu interface throughput is much higher and fluctuates more. If the bandwidth reservation is not used, then congestion can occur both in the Iub transport network (TN) between the RNC and the Node-B and also in the Uu interface between the Node-B and the UE. In the current architecture, TCP cannot efficiently resolve a congestion situation in the access network, because lower layer retransmissions hide the congestion situations from the TCP. Thus, a flow control function is introduced to control the data transfer between the RNC and Node-B in HSDPA.

Originally, the flow control (FC) was designed to take only the transmission capabilities of the Uu interface into account and to limit the latency of layer 2 signalling. However, the increased Uu interface capacity did not always coincide with similarly increased Iub TN capacity in practice. The cost of Iub transport links is still high and is not expected to decrease dramatically. It is a common scenario that the throughput is limited by the capacity available on the Iub TN links and not by the capacity of the Uu interface. On these high cost TN links, it is important to maintain high efficiency.

The protocol layers and the nodes involved in the HSDPA are illustrated in FIG. 2. The HSDPA FC is located in the Node-B. The task of the FC is to regulate the transfer of Medium Access Control-d Protocol Data Units (MAC-d PDUs) from the RNC to the Node-B. More precisely, the FC regulates the transfer of data from the Radio Link Control (RLC) buffer in RNC to the MAC-hs buffer in Node-B.

There are at least two types of bottlenecks—the Iub TN and the air interface (Uu) bottlenecks. Typically, the Iub TN bottleneck is a single link between RNC and Node-B, where all flows of the same Node-B share the same TN bottleneck buffer and TN capacity. These flows can utilize the remaining TN capacity from high priority traffic (e.g. DCH). Each flow belonging to the same cell shares Uu resources, but each flow has a dedicated priority queue (PQ) in the Node-B in the form of MAC-hs buffers. A Node-B can include one or more cells. The FC is responsible for efficient use of these changing TN and Uu bottlenecks. It is desirable to maintain high end-user throughput while also maintaining low end-to-end delay for delay sensitive applications such as gaming. The delay target for MAC-d PDUs is typically smaller than 100 ms.

The HSDPA FC is used to avoid or limit Iub TN and Uu congestions. In the Node-B, the flow control function calculates the bit rate of the HSDPA flow and the calculated bit rate is sent to the RNC using the standardized CAPACITY ALLOCATION (CA) control frame. In the RNC, the HSDPA is shaped with this bit rate. Practically, if there is some congestion in the Iub TN or in the Uu part, the flow control function reduces the bit rate of HSDPA flow to resolve the congestion.

SUMMARY

One aspect of the invention, a mechanism is provided to resolve the Iub transport network congestion efficiently for HSDPA by dynamic adjustment of the transmit window of the RLC. If complex architecture is wished to be avoided, the Uu congestion control can also be integrated in the proposed congestion control. In this way, there is the option of not using the existing Iub flow control (in the event that separate control for the Iub TN congestion and for Uu congestion), or the existing Uu congestion control can be kept.

In an aspect, the RLC protocol is extended with congestion control functionality. The Iub TN and Uu congestion detection method in the Node-B signals the congestion to the RNC, and this congestion indication is used by RLC to react on the congestion situation.

In the RNC, instead of controlling the bit rate of the flow, the transmission window of the RLC is used to control the flow rate. The RLC transmission window limits the number of unacknowledged packets. When congestion is detected, the RLC transmission window size is decreased. In this way, the possible bit rate of the flow is reduced. When there is no congestion, then the RLC transmission window size can be increased automatically. Different types of congestion are distinguished and are handled in different ways.

In an alternative solution, congestion control is achieved without any modification in the RLC layer from the existing standard. Here, RLC STATUS PDUs are used to change the RLC transmission window size.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
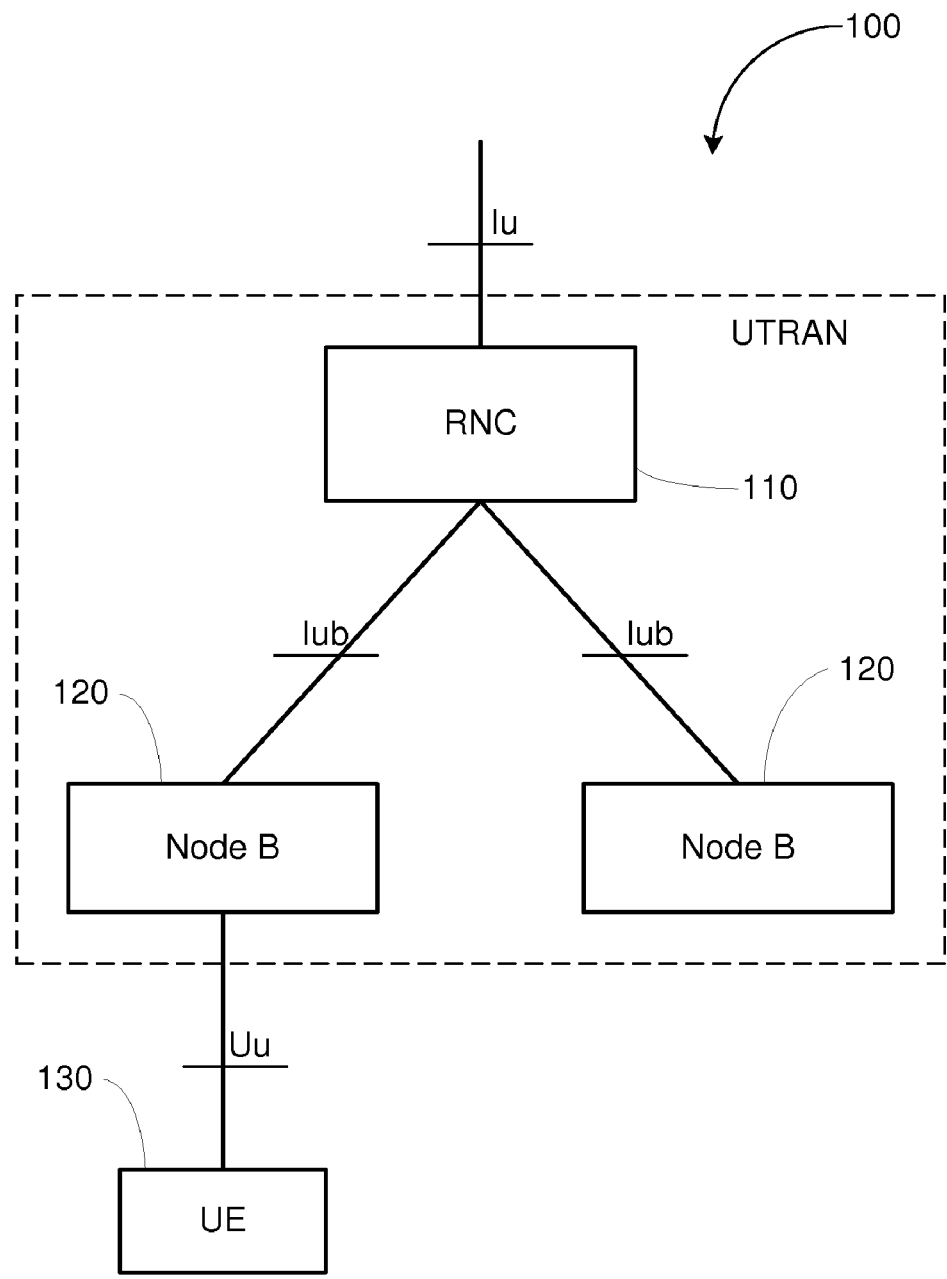
FIG. 1 illustrates an example wireless network system.
Figure 2:
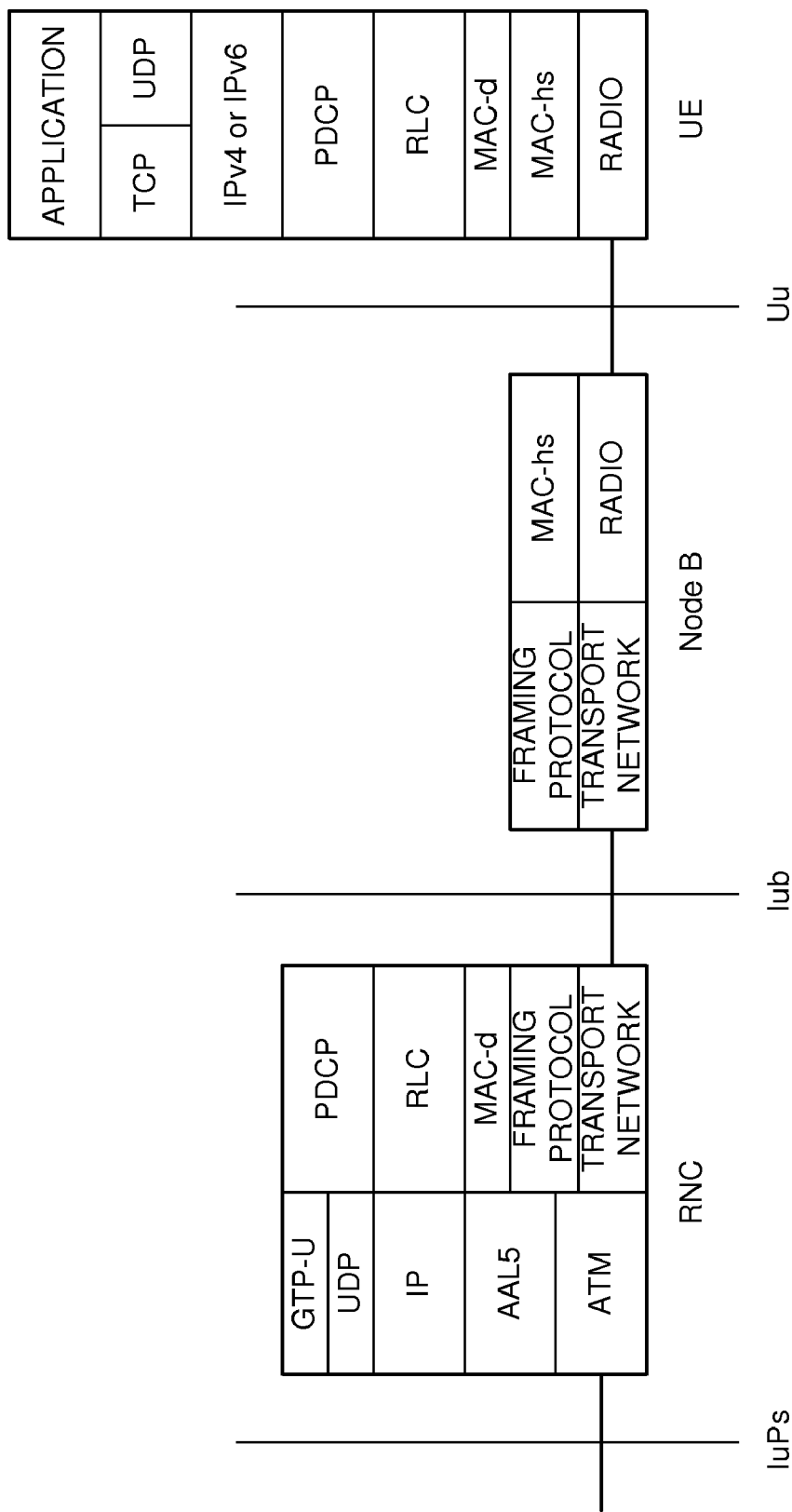
FIG. 2 illustrates protocol layers and the nodes involved in HSDPA.

In the HSDPA architecture illustrated in FIG. 2, the RLC layer in the RNC generates RLC PDUs to be sent to the peer RLC entity in the UE. The RLC layer provides the RLC PDUs to the MAC layer. The MAC layer is split between the RNC and the Node-B. MAC PDUs generated by the RNC (associated with the RLC PDUs), called MAC-d PDUs, are aggregated and sent to the Node-B over the Iub interface in HS-DSCH Data Frames. The Node-B buffers the MAC-d PDUs in the associated priority queues (PQ), i.e., in the MAC-hs buffer, until they are scheduled and successfully transmitted over the Uu interface to the UE. The delivery of the MAC-d PDUs over the Iub is managed by the Iub FC. In an aspect, data flow (or simply flow) can be viewed as the flow of the RLC PDUs, which are associated with the MAC-d PDUs, from the RLC layer between the RNC and the UE via the Node-B. From another perspective, the flows can be viewed as the flows of the MAC-d PDUs associated with the RLC PDUs.

The Iub FC related data frames and control frames are standardized in 3GPP. HS-DSCH Iub data frames contain the user data and transmit information about the amount of user data waiting in the RNC, called User Buffer Size (UBS), and contain information for congestion detection, the Frame Sequence Number (FSN) and the Delay Reference Time (DRT).

Based on the UBS, the Uu related information, and the congestion detection information, the Iub FC algorithm in the Node-B decides how many MAC-d PDUs can be transmitted from the RNC for a given flow. The Node-B reports this to the RNC using the HS-DSCH Capacity Allocation (CA) control frame. The CA message can include the following parameters:

HS-DSCH Credits—the number of MAC-d PDUs allocated;

Maximum MAC-d PDU Length—the maximum size of each MAC-d PDU;

HS-DSCH Interval—the time interval over which the data can be sent; and

HS-DSCH Repetition Period—the period over which this allocation is refreshed and repeated.

The MAC-d shaping in the RNC ensures that within a given HS-DSCH Interval, not more than the HS-DSCH Credits PDUs are sent. The HS-DSCH Repetition Period defines how many times the HS-DSCH Interval and the HS-DSCH Credits are repeated. A newly received CA overrides the old one.

The MAC-hs is responsible for link adaptation, HARQ and channel-dependent air interface scheduling. RLC Acknowledged Mode (AM) is used to compensate for HARQ failures, to provide seamless HS-DSCH handover, and to provide efficient channel switching to/from DCH. The RLC in AM retransmits all RLC PDUs that are lost in the Iub TN or the Uu. Packet losses and the resulting RLC retransmissions significantly increases the delay variation. Thus, it is desirable to minimize the packet losses and the RLC retransmission. It is also desirable to keep the TN delay low due to delay sensitive applications over HSDPA and to minimize control loop delay for Iub FC and RLC.

Delay in the PQ for applications that are not sensitive to delays, e.g., web browsing or email is not necessarily a problem for the end-user. However, the delay can still be a problem for RLC protocol performance and during handover when all PDUs waiting in a PQ are dropped. For delay sensitive applications, the PQs usually store small amount of data because these applications usually generate low load.

There are existing solutions to address the congestion issue. In the existing solutions: 1) The TN congestion is not considered at all (it is assumed that the TN can not be the bottleneck); or 2) The TN congestion is handled by the Iub FC. In this case, the Iub FC handles both the Uu and Iub congestion.

There are disadvantages to the existing solutions. In the first solution, the TN network must be over-provisioned to avoid the TN congestion. This can lead to serious performance degradation. In the second solution, the TN congestion is resolved without using any RLC support. Practically, the existing Iub FC performs both tasks—resolves the Uu congestion and resolves the Iub congestion. The existing solutions do not utilize any support from RLC to perform the congestion control of Iub TN.

However, the RLC itself has the ability to resolve congestion. It is proposed that the RLC be used to control the bit rate of the flow. In one aspect, the transmission window of the RLC is adjusted based on the congestion status of the Iub TN and/or the Uu interfaces. If there is congestion, the size of the RLC transmission window is decreased. In this way, the possible RLC transmission rate of the flow is also decreased. In one embodiment, the congestion detection functionality is kept in the Node-B.

The existing solutions are rate based. In contrast, one or more embodiments of the disclosed apparatus and methods use a window based solution to control the congestion. The window based solution has a self-clocking property that can make the flow-control more efficient in case of changing bottleneck capacity (e.g. in case of arrival/departure high priority DCH traffic).

In one aspect, the RLC protocol is extended with congestion control functionality. The Iub TN and Uu congestion detection method in the Node-B signals the congestion to the RNC, and this congestion indication is used by RLC in the RNC to react on the congestion situation.

The transmission window of the RLC is used to control the rate of the flow, e.g., control the bit rate of the flow. The RLC transmission window limits the number of unacknowledged RLC PDUs. That is, when the RLC transmission window size is set, it sets a maximum amount of outstanding data for the flow that can be transmitted from the RNC to the UE in one or more RLC PDUs until an acknowledgment (ACK) is received from the UE. When the congestion occurs, the RLC transmission window size is decreased. In this way, the bit rate of the flow is reduced. When there is no congestion, then the RLC transmission window size can be increased.

Different types of congestion are distinguished and the reactions to the types of congestion can differ. For example, for a "loss" in the Iub TN, i.e., loss of MAC-d PDUs from the RNC to the Node-B, the RLC transmission window size can be reduced by relatively a large amount. For a "delay build-up" congestion, i.e., accumulation of the MAC-d PDUs for the flow in the Node-B beyond a predetermined threshold level, the RLC transmission window size can be reduced by relatively a small amount. The congestion can be signaled to the RNC through the HS-DSCH CAPACITY ALLOCATION (CA) control frame.

Alternatively, the RLC transmission window size can be changed without any changes to the RLC functionalities in the RNC as standardized in 3GPP. In this alternative, the RLC transmission window size can be changed through RLC STATUS PDUs. As will be further demonstrated below, a new RLC STATUS PDU can be generated or the window size information can be overwritten in an arriving RLC STATUS PDU. The RLC STATUS PDU—whether newly generated or overwritten—can be sent to the RLC entity which functions according to the existing 3GPP standard.

In one aspect, the existing Uu congestion control mechanisms are kept and the RLC transmission window size is adjusted to control the Iub TN congestion. In another aspect, the RLC transmission window size is adjusted to control both the Iub TN congestion and the Uu congestion.

The proposed solution includes one or more of the following three parts:
 Iub TN congestion detection at the framing protocol level in the Node-B. This part detects transport network congestion (i.e. Iub TN congestion).
 Uu congestion detection in the Node-B. This part detects Uu congestion. The Uu congestion can be detected based on how many many MAC-hs packets are waiting for Uu resource.
 Congestion control at RLC level in the Node-B. This part reacts on the received congestion indication coming from Iub congestion detection in Node-B. The congestion indication can be transferred from the Node-B to RNC, for example, through the CA control frame.

Figure 3A:
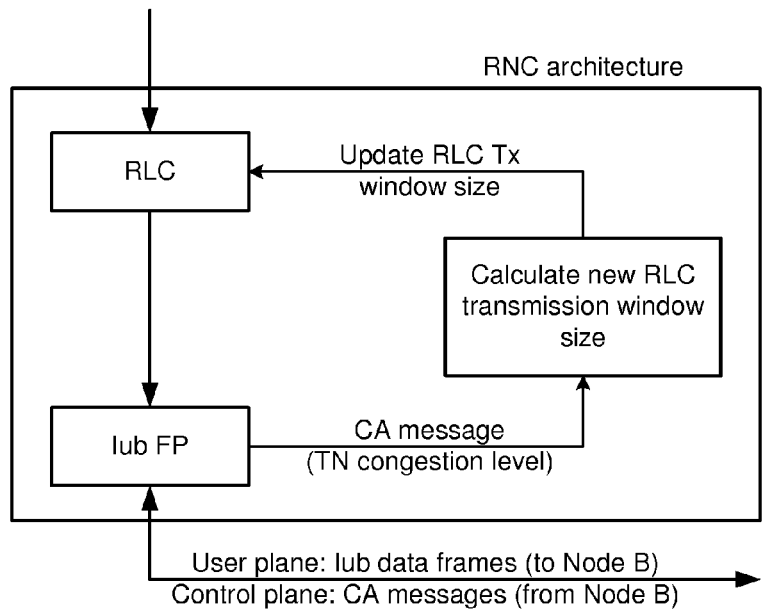
FIG. 3A illustrates an embodiment of an architecture of an RNC that includes an RLC with transmission window size support for both Iub TN and Uu congestion handling.

FIG. 3A illustrates an embodiment of an architecture of the RNC that includes the RLC with transmission window size support for both Iub TN and Uu congestion handling. For each CA message received, the RNC calculates a new RLC transmission window size based on the congestion indicated in the CA message, and sets the RLC transmission window size.

Figure 3B:
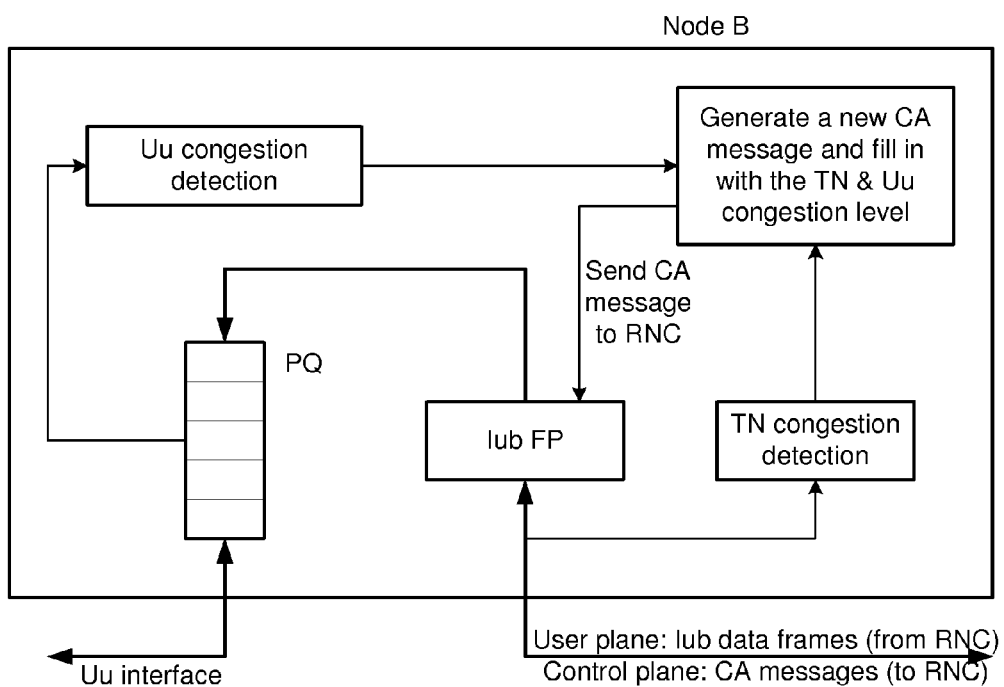
FIG. 3B illustrates an embodiment of an architecture of a Node-B for handling both Iub TN and Uu congestions.

FIG. 3B illustrates an embodiment of an architecture of the Node-B for handling both Iub TN and Uu congestions. The Node-B detects both the congestion on the Uu interface (accumulation of MAC-d PDUs on the PQ) and congestion on the Iub TN. When the congestion is detected, the Node-B notifies the RNC, for example, through a CA message with the type of congestion indicated therein.

Figure 4A:
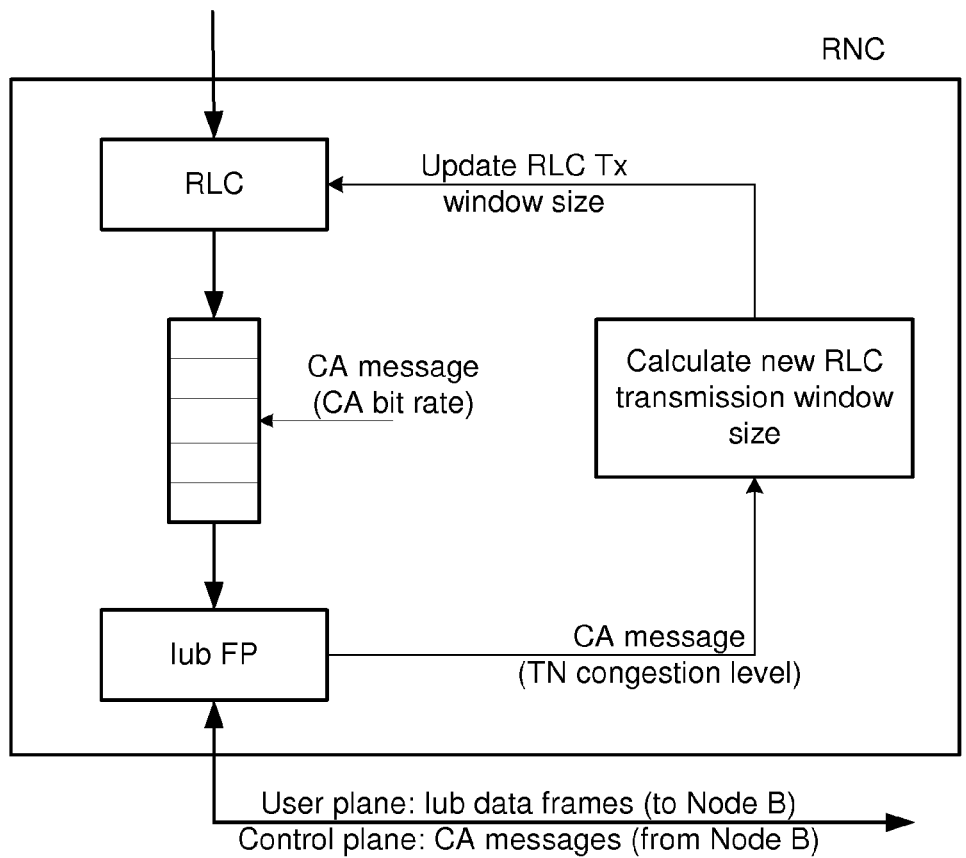
FIG. 4A illustrates an embodiment of an architecture of the RNC that includes the RLC with transmission window size support for the Iub TN congestion handling.

FIG. 4A illustrates an embodiment of an architecture of the RNC that includes the RLC with transmission window size support for Iub TN congestion handling. For each CA message received, the RNC:
 Extracts the shaping rate from the CA frame.
 Calculates a new RLC transmission window size based on the shaping rate.

Sets the RLC transmission size.

Continues processing the received CA message according to the original process.

Figure 4B:
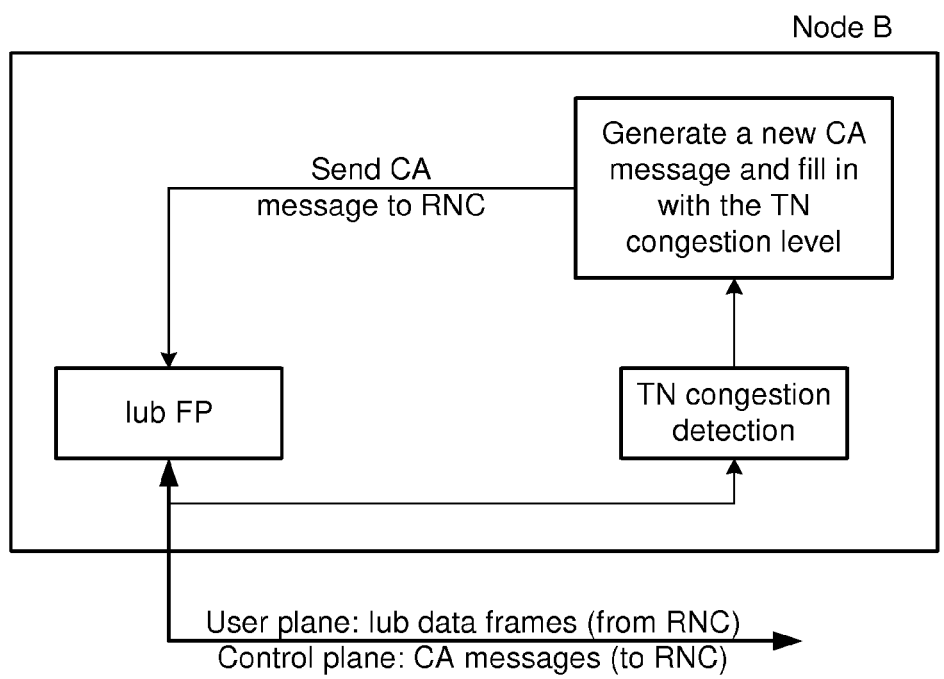
FIG. 4B illustrates an embodiment of an architecture of the Node-B for handling the Iub TN congestion.

FIG. 4B illustrates an embodiment of an architecture of the Node-B for handling the Iub TN congestion. The Node-B detects both the congestion on the Iub TN, and notifies the RNC through a CA message with the type of congestion indicated therein.

Figure 5:
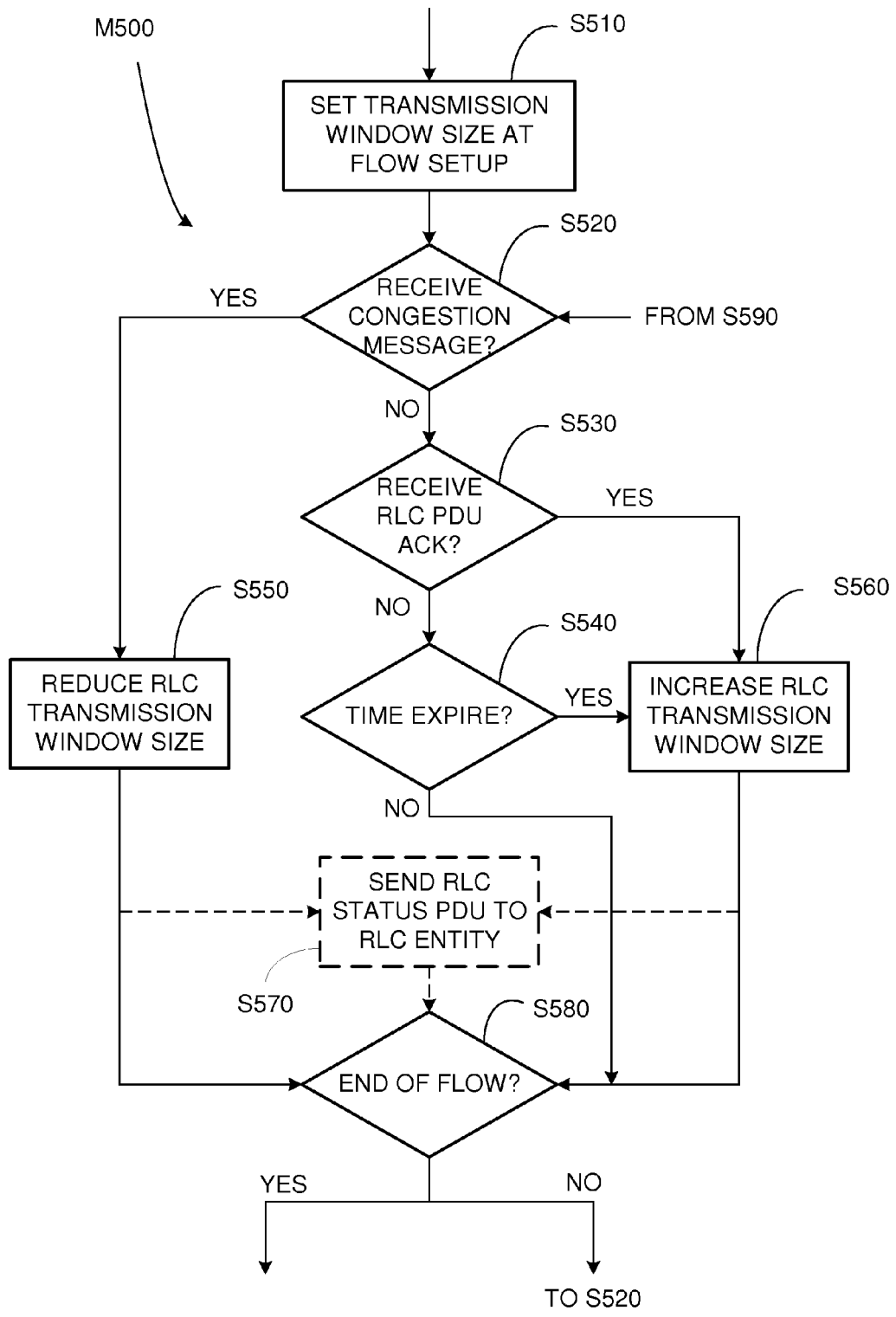
FIG. 5 illustrates an example method to operate the RNC to adapt the RLC transmission window size for a flow of MAC-d PDUs.

FIG. 5 illustrates an example method M500 to operate the RNC to adapt the RLC transmission window size for a data flow (or simply flow). Here, it is assumed that the RNC is able to exchange RLC PDUs with the UE through the Node-B. More specifically, the RLC layer in the RNC exchanges the RLC PDUs with the peer RLC layer in the UE.

In step S510, the RLC transmission window size for the flow within the RNC is set at initial flow set up. In one embodiment, an RLC entity that is arranged to implement the RLC functionalities may perform the initial set up and determine the initial RLC transmission window size. In another embodiment, the Node-B itself can make the initial allocation of HS-DSCH Credits when the radio link with the UE is first configured to determine the initial window size. In yet another embodiment, a slow-start phase may be used. For example, for every acknowledged RLC PDU, the size of the RLC transmission window can be increased by one RLC PDU.

Figure 6:
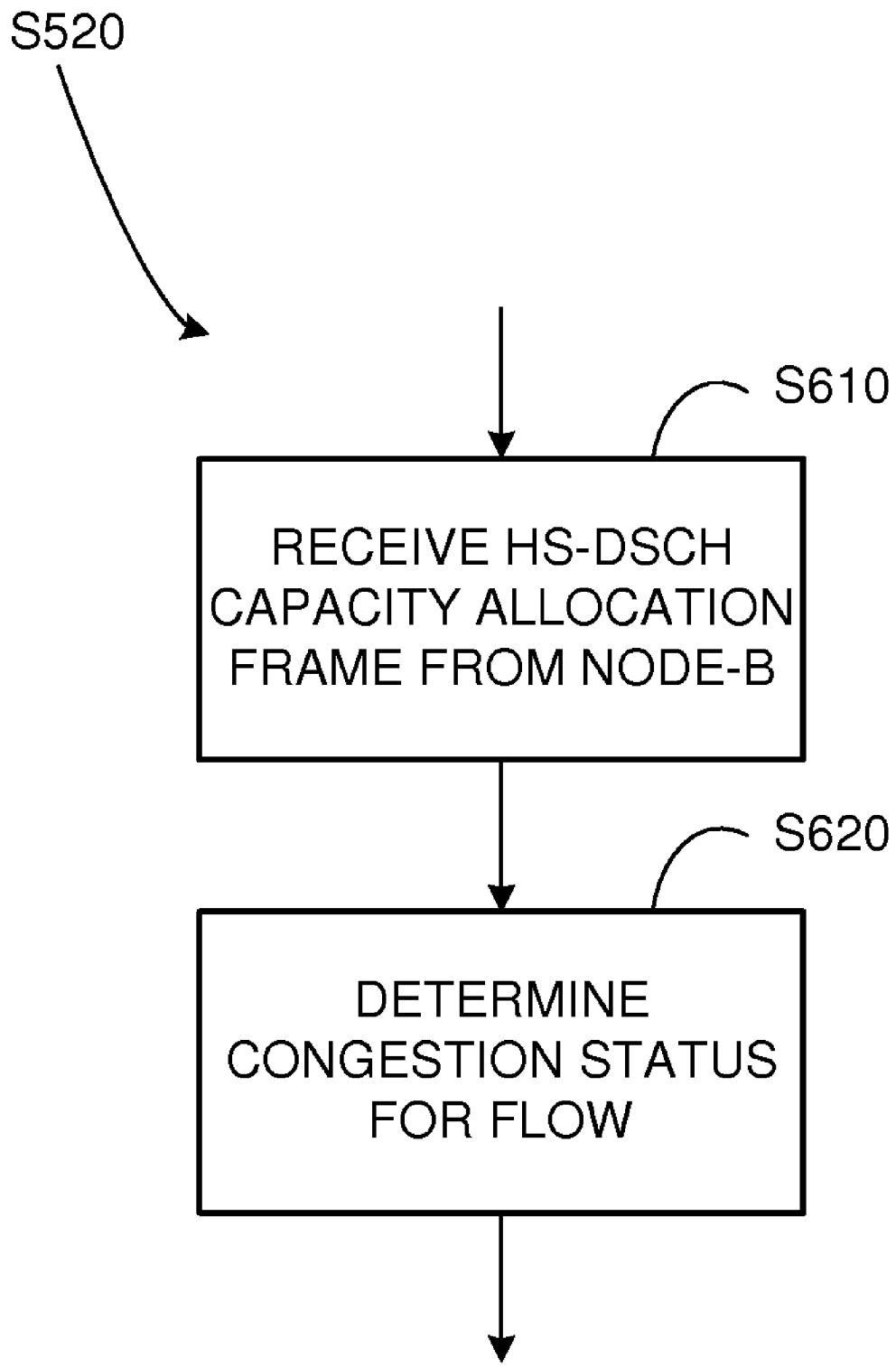
FIG. 6 illustrates and example process to determine whether a congestion message is received from the Node-B.

In step S520, the RNC determines whether a congestion message is received from the Node-B. FIG. 6 illustrates an example process to implement the step S520. In step S610, the RNC receives the CA frame from the Node-B and the congestion status for the flow is determined based on the information contained in the CA frame in step S620.

In 3GPP, the CA frame includes a two-bit Congestion Status parameter which indicates one of no congestion, delay build-up congestion, and loss congestion. The delay build-up congestion indicates that the MAC-d PDUs for the flow buffered, e.g., the MAC-hs buffer, within the Node-B have accumulated by a predetermined threshold amount or greater. The TN loss congestion indicates that one or more MAC-d PDUs for the flow have been dropped. When the TN loss congestion occurs, the corresponding RLC PDUs are retransmitted by the RNC to the Node-B.

Figure 7A:
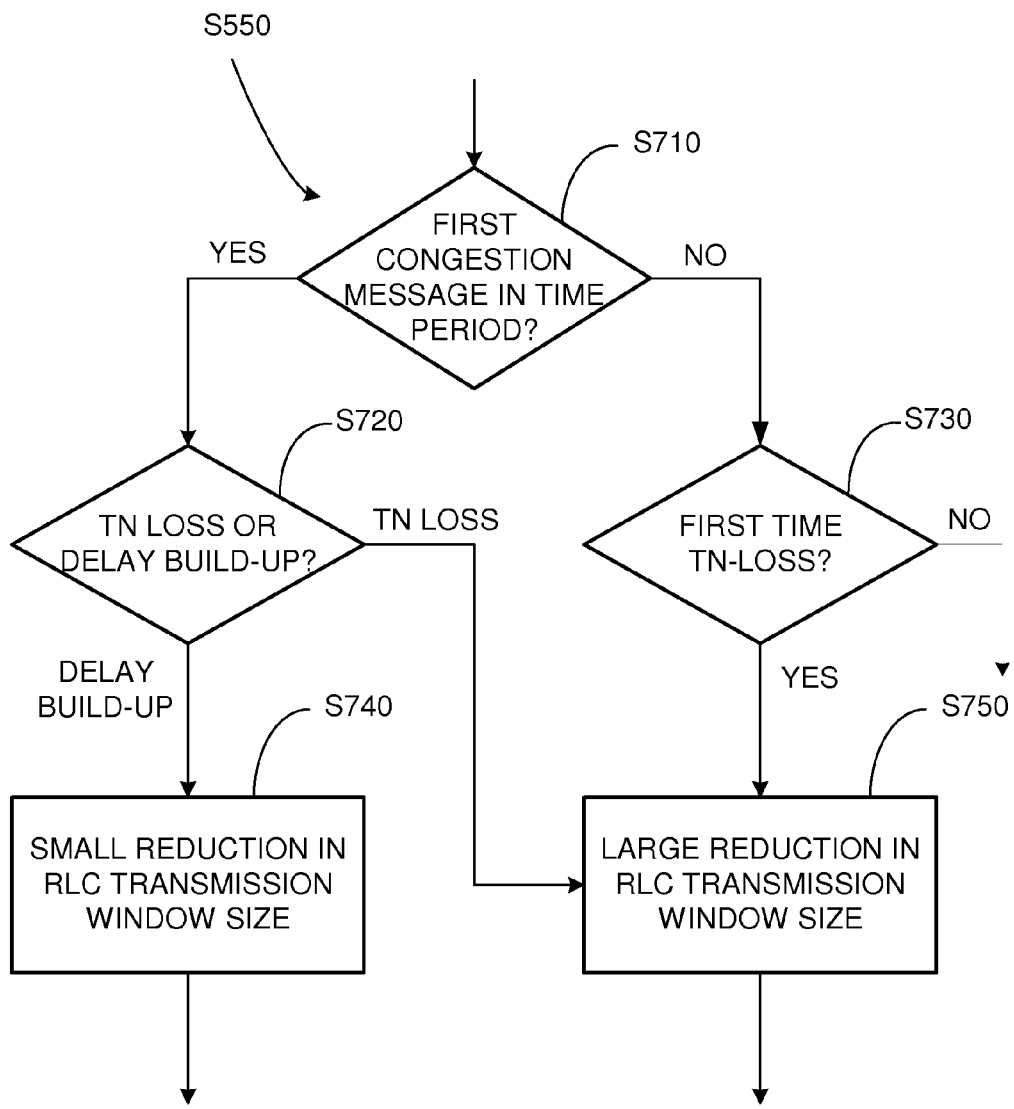
FIG. 7A illustrates an example process to reduce the RLC transmission size.

Referring back to FIG. 5, if the congestion message is received in step S520, then in step S550, the RNC reduces the RLC transmission window size. FIG. 7A illustrates an example process to implement the step S550. In step S710, the RNC determines whether the congestion message is received for a first time within a predetermined time period. Here, the predetermined time period can be viewed as a time period since the initial flow set up or since an expiration of a previous measurement time period, whichever came last.

If it is the first time receipt of the congestion message, then in step S720, the RNC determines whether the congestion is a delay build-up congestion or a TN loss congestion. If congestion is the delay build-up type, then the RLC transmission window size is reduced by a first amount in step S740. If congestion is the delay build-up type, then in step S750, the RLC transmission window size is reduced by a second amount which is larger than the first amount. That is to say, there is preferably a larger reduction when the TN loss congestion occurs than when the delay build-up congestion occurs.

In one embodiment, the first and second amounts may be fixed. In another embodiment, the first and second amounts can be a fixed multiplication factor applied to the current RLC transmission size. For example, when the delay build-up or the TN loss congestion is encountered, the current RLC transmission size can be multiplied by a first factor f1 or a second factor f2, respectively. In this case, the relationship $0<f1<f2<1$ should hold true.

By determining whether or not this is the first receipt of the congestion message in step S710, even if multiple congestion messages arrive to the RNC within the given time period, multiple adjustments to the RLC transmission window can be prevented.

However, there may be an instance in which it is desirable to react to the subsequent receipt of congestion messages within the given time period. More specifically, for any first receipt of the TN loss congestion message since the initial flow set up, it is preferred that the RLC transmission window is reduced accordingly. This is reflected in steps S710, S730, and S750.

Note that it may be desirable to maintain a minimum RLC transmission window size. Thus, in an embodiment, if the reduction in the RLC transmission window size in steps S740 and S750 results in a window size that is below a predetermined minimum window size, then the RLC transmission window size is set to the predetermined minimum window size.

Figure 7B:
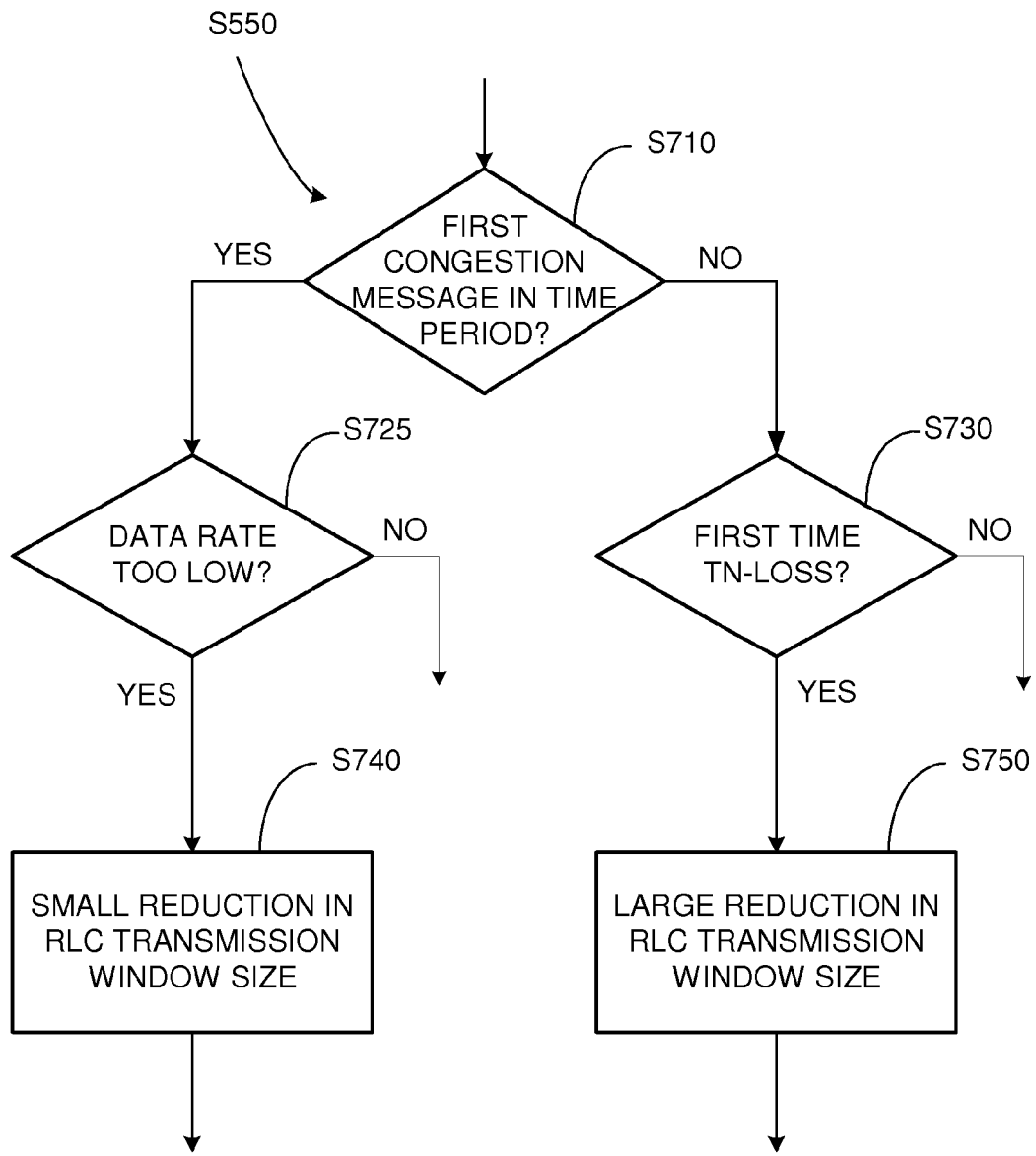
FIG. 7B illustrates another example process to reduce the RLC transmission window size.

FIG. 7B illustrates another example process to implement the step S550. Here, the congestion message may indicate an data rate for the flow set by the Node-B. In step S725, the RNC determines whether the data rate is too low for the RLC transmission window size. Conversely, the step 725 can be viewed as determining whether the RLC transmission window size is too big based on the data rate.

Figure 8:
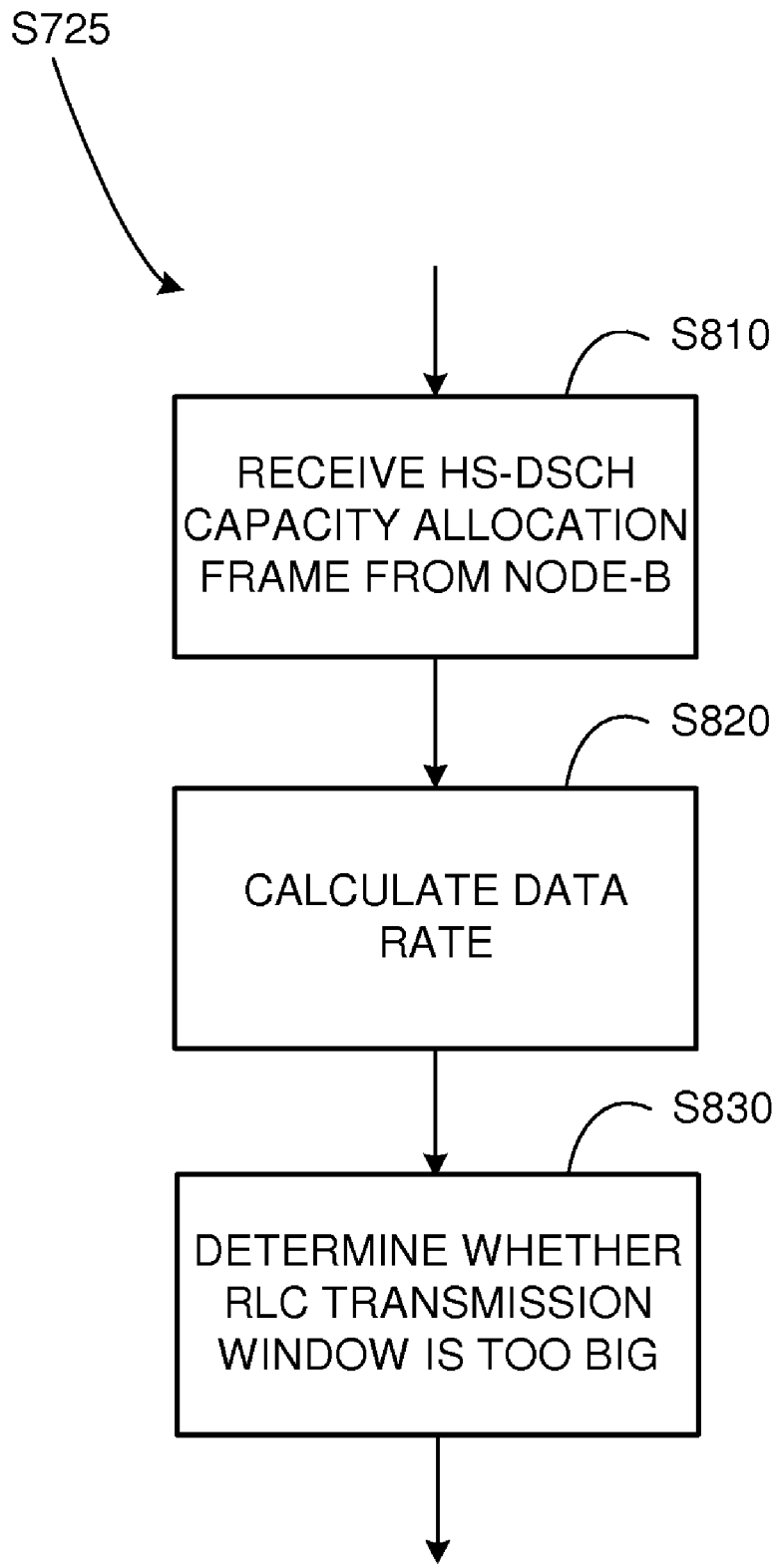
FIG. 8 illustrates an example process to determine when the RLC transmission window size is too big.

FIG. 8 illustrates an example process to implement the step S725. In step S810, the RNC receives a HS-DSCH CA control frame from the Node-B over the Iub TN. In step S820, the data rate is calculated based on any or all of the Maximum MAC-d PDU Length, HS-DSCH Credits, HS-DSCH Interval, and HS-DSCH Repetition Period specified in the CA frame. In step S830, the RNC determines whether the RLC transmission window size for the flow is too big based on the calculated data rate.

In one embodiment, the RLC transmission window size is determined to be too big if an amount of data that can be held in an RLC buffer corresponding to the RLC transmission window size is greater than an amount of data that can be sent within a predetermined target round trip time over the Iub TN between the RNC and the Node-B based on the calculated data rate.

While congestion indicates that the RLC transmission size should be decreased to thereby decrease throughput of the flow, other situations can indicate that the RLC transmission size can be increased to correspondingly increase the throughput. Referring back to FIG. 5, if the RNC receives an RLC PDU acknowledgment (ACK) from the UE of previously sent RLC PDUs in step S530, then the RNC can increase the RLC transmission size in step S560.

Also, if a timer expires in step S540, which indicates that a predetermined amount of time has passed since the initial flow set up or since an expiration of a previous measurement time period, then the RLC transmission size can be increased in step S560. The timer expiring indicates that no congestion has occurred within the measurement time period. While not explicitly shown, it can be generally assumed that the timer is reset when it is determined that time has expired in step S540.

The size of the RLC transmission window is preferred not to increase without limit. Thus, in an embodiment, if the increase results in the window size being greater than a predetermined maximum window size, the RLC window size is set to the predetermined maximum window size.

One practical effect is that by setting the RLC transmission window size (either increase or decrease), a maximum amount of outstanding data is set for the flow that can be transmitted from the RNC to the UE in one or more RLC PDUs until an acknowledgment (ACK) is received from the UE.

In one aspect, the RLC entity in the RNC can set (reduce/increase) the RLC transmission window size in the steps S550 or S560. That is, the RLC layer functionalities in the RNC sets the RLC transmission window size. This may be considered as an RLC layer implementation that is different from the existing 3GPP standard.

However, the RLC transmission window size update can be accomplished without deviating from the 3GPP standard. The existing standard indicates that the receiver of the RLC PDUs (either the UE or the RNC) can set the RLC transmission window size of the sender (the RNC or the UE) by sending an RLC STATUS PDU to the receiver with the desired transmission window size indicated therein. The sender, upon receiving the RLC STATUS PDU, adjusts the window size accordingly.

Thus, in one embodiment, the RLC entity (or unit) within the RNC performs the RLC functions conforming to the existing 3GPP standard. In this embodiment, another entity that is separate from the RLC unit, is used. Note that "separate" only indicates a separate function be provided. While completely separate hardware can be provided, similar results can be achieved through software and/or firmware.

In this alternative embodiment, the size of the RLC transmission window is determined in steps S550 and S560 but not set. After the size is determined, an RLC STATUS PDU message with the determined window size indicated therein is sent to the RLC unit implementing the standard RLC functionalities in step S570. Preferably, the RLC STATUS PDU is made to appear as if it is from the receiver of the flow of the RLC PDUs sent by the RNC, i.e., the corresponding UE. The box for step S570 in FIG. 5 is dashed to indicate this is an alternative. In this embodiment, the separate entity (preferably within the RNC) sends the RLC STATUS PDU to the RLC unit.

Figure 9A:
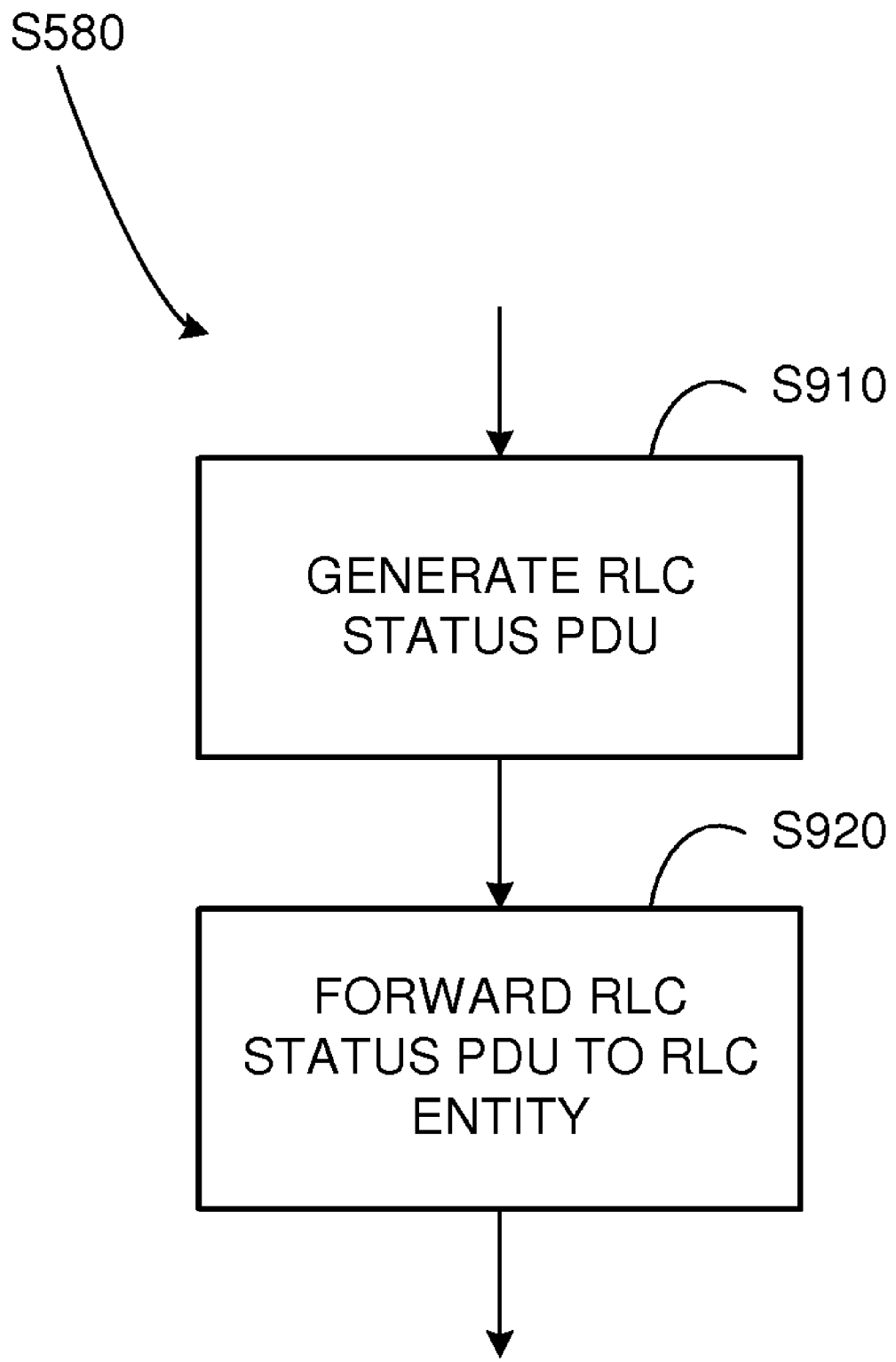
FIG. 9A illustrates an example process to send an RLC STATUS PDU to an RLC entity within the RNC.

FIG. 9A illustrates an example process to implement the step S570. In this instance, an entirely new RLC STATUS PDU with the RLC transmission window size specified therein is generated in step S910, and the generated RLC STATUS PDU is sent to the RLC unit in step S920.

Figure 9B:
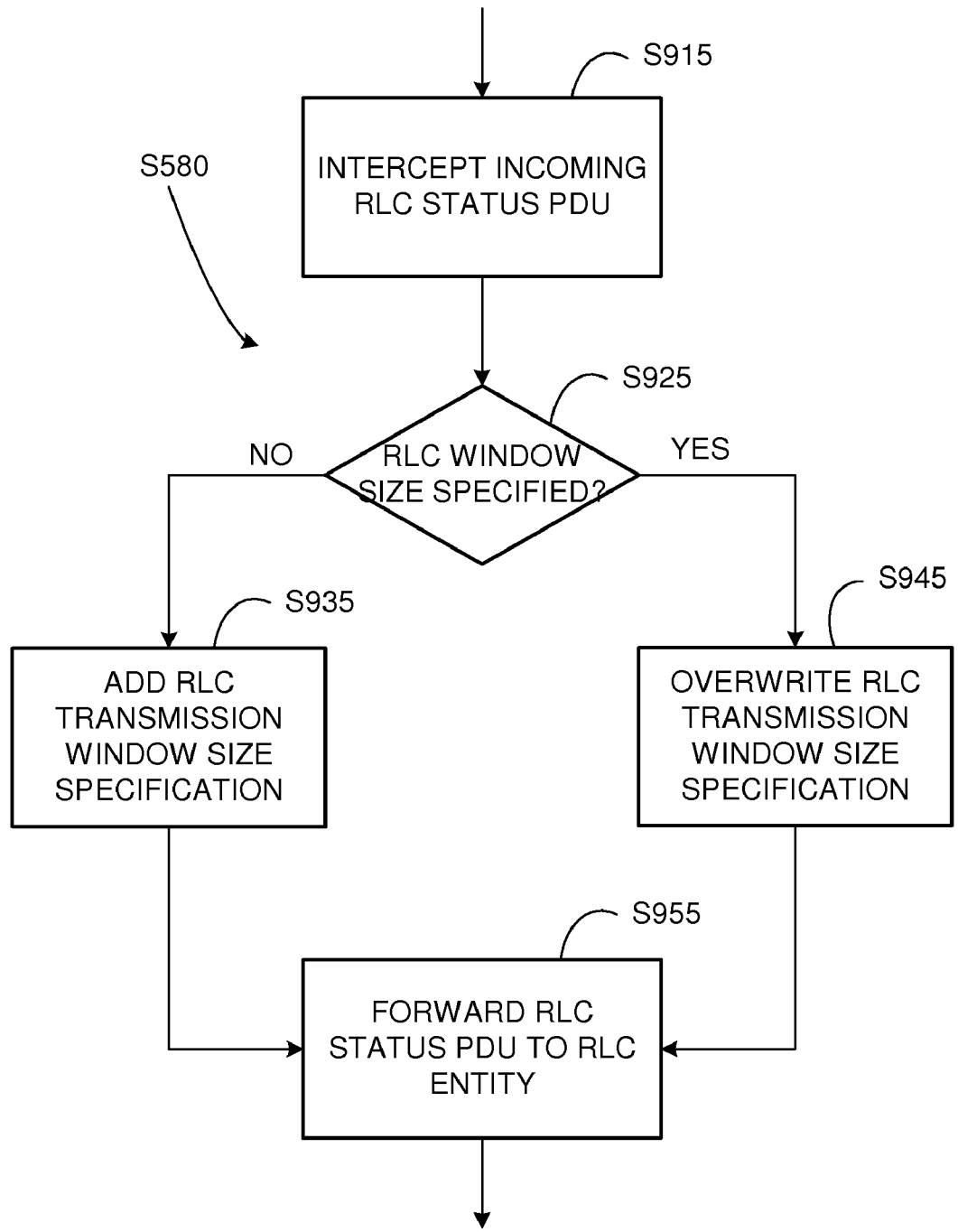
FIG. 9B illustrates another example process to send the RLC STATUS PDU to the RLC entity within the RNC.

However, there may be instances where the actual receiver of the RLC PDUs, i.e., the UE, sends the RLC STATUS PDU destined for the RNC. FIG. 9B illustrates an example process to implement the step S570 in such situations. In step S915, the incoming RLC STATUS PDU from the UE is intercepted, and in step S925, it is determined whether or not the RLC transmission window size for the flow is specified in the intercepted RLC STATUS PDU. If the window size is not specified, then the window size specification is added to the RLC STATUS PDU in step S935. If the window size is specified, then the window size specification can be overwritten with the RLC transmission window size determined in the step S550 or S560. In an embodiment, the RLC transmission window size is overwritten only if determined size is less than the size already specified in the RLC STATUS PDU. Then in step S955, the modified RLC STATUS PDU is forwarded to the RLC unit implementing the standard RLC layer functionalities.

Referring back to FIG. 5, in step S580, it is determined if the flow has ended, i.e., whether the communication between the RNC and the UE has ceased. If so, the method ends. If not, the method proceeds back to step S520.

Figure 10:
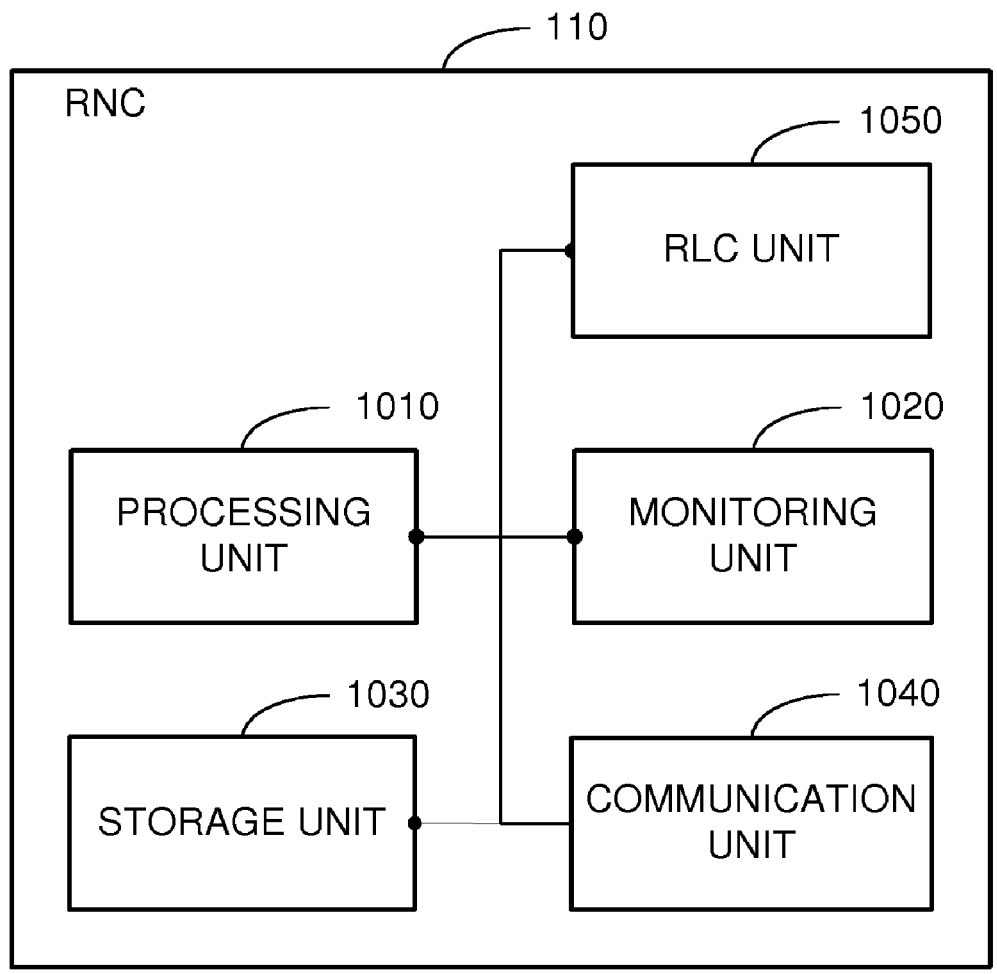
FIG. 10 illustrates an embodiment of the RNC.

FIG. 10 illustrates an example embodiment of the RNC arranged to implement the methods described above. The RNC includes a processing unit 1010, a monitoring unit 1020, a storage unit 1030, a communication unit 1040, and an RLC unit 1050. The processing unit 1010 is arranged to control the overall operations of the RNC including coordinating and controlling the other units 1020-1050 to perform the methods.

The monitoring unit 1020 is arranged to monitor statuses of the RNC including monitoring the data traffic conditions on communication links between the RNC and the Node-B such as the Iub TN. The storage unit 1030 is arranged to store information necessary for proper functioning of the RNC 110 including storing data and control information for the data flow between the RNC and the UE. The storage unit 1030 can be used to buffer the RLC PDUs, MAC PDUs, etc. to implement the protocol architecture. The communication unit 1040 is arranged to communicate with the UE through the Node-B including exchanging RLC PDUs, packaged in corresponding MAC-d PDUs. The communication with the Node-B can occur over the Iub TN.

The RNC can also include a RLC unit 1050 arranged to perform the RLC procedures according to the 3GPP standard. In this instance, the processing unit 1010 can determine the RLC transmission window size and send the RLC STATUS PDU with the transmission size specified therein to the RLC unit 1050 as described above.

The units 1010-1050 are illustrated as separate units in FIG. 10. However, this is merely to indicate that the functionalities are separated. The units can be provided as separate hardware devices. However, other configurations are possible. Any combination of the units can be implemented in any combination of software, hardware, and/or firmware.

Figure 11:
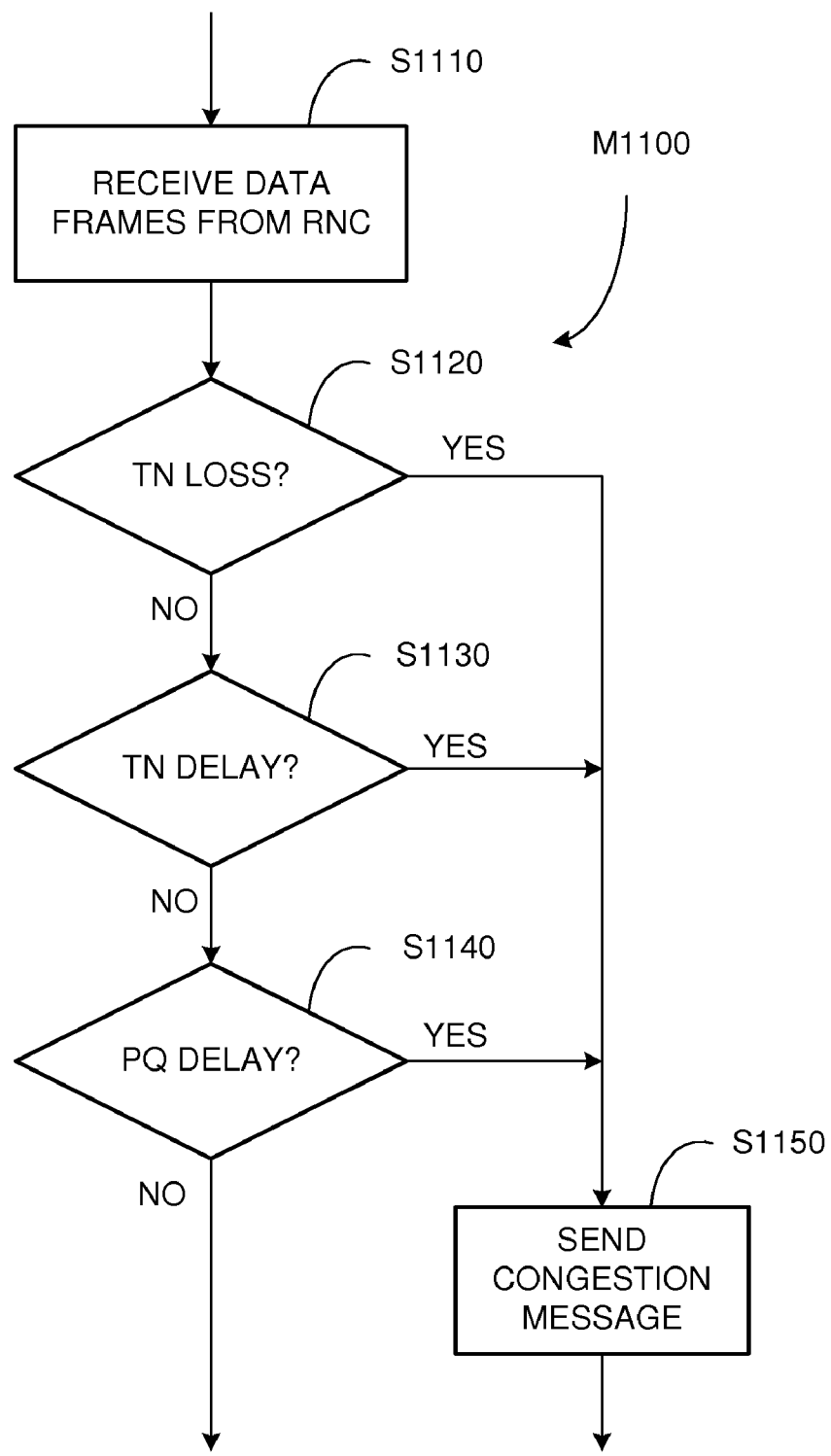
FIG. 11 illustrates an example method to operate the Node-B to determine whether there the congestion exists and to notify the RNC of the congestion.

FIG. 11 illustrates an example method M1100 to operate the Node-B to so that the RNC can adapt the RLC transmission window size for the flow. In this example method, the Node-B notifies the RNC of any congestion condition. In step S1110, the Node-B receives the MAC-d PDUS for the flow from the RNC. The MAC-d PDUs received from the RNC is buffered and transferred to the UE.

In steps S1120 and S1130, the Node-B determines whether there is a congestion—either a TN loss (step S1120) or a delay build-up congestion (step S1130) for the flow. If the Node-B determines that the congestion exists, then in step S1150, the Node-B sends a congestion message to the RNC.

In one embodiment, the Node-B detects that there are dropped MAC-d PDUs, i.e., that the TN loss has occurred, by examining one more MAC-d PDUs that it has received from the RNC. For example, frame sequence numbers of the MAC-d PDUs may be examined for this purpose. The Node-B also detects that the delay build-up congestion has occurred when it determines that the MAC-d PDUs of the flow from the RNC have accumulated in the Node-B by a predetermined threshold amount or greater.

When sending the congestion message to the RNC in step S1150, the Node-B can send the message in a HS-DSCH Capacity Allocation control frame with the Control Status bits set accordingly.

The method can also determine Uu congestion as well. In FIG. 11, the Node-B determines whether there is a delay in the PQ in step S1140. More specifically, the Node-B determines whether the whether the number of MAC-d PDUs in a PQ corresponding to the flow in the Node-B is at or greater than a predetermined PQ threshold. If so, the Node-B sends a congestion message to the Node-B in step S1150. When this occurs, the Node-B includes a capacity data rate information for the flow. The capacity data rate notifies the RNC of the data rate that can be provided for the flow. The data rate can also be provided in the HS-DSCH CA frame message.

Figure 12:
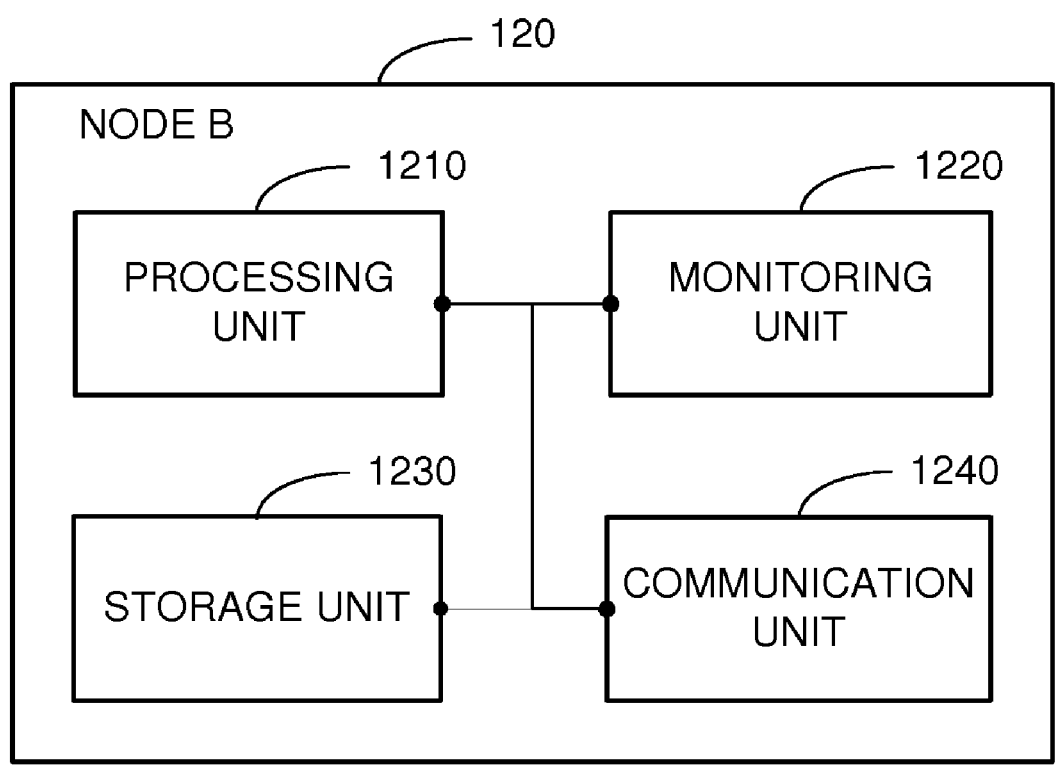
FIG. 12 illustrates an embodiment of the Node-B.
Figure 7A:
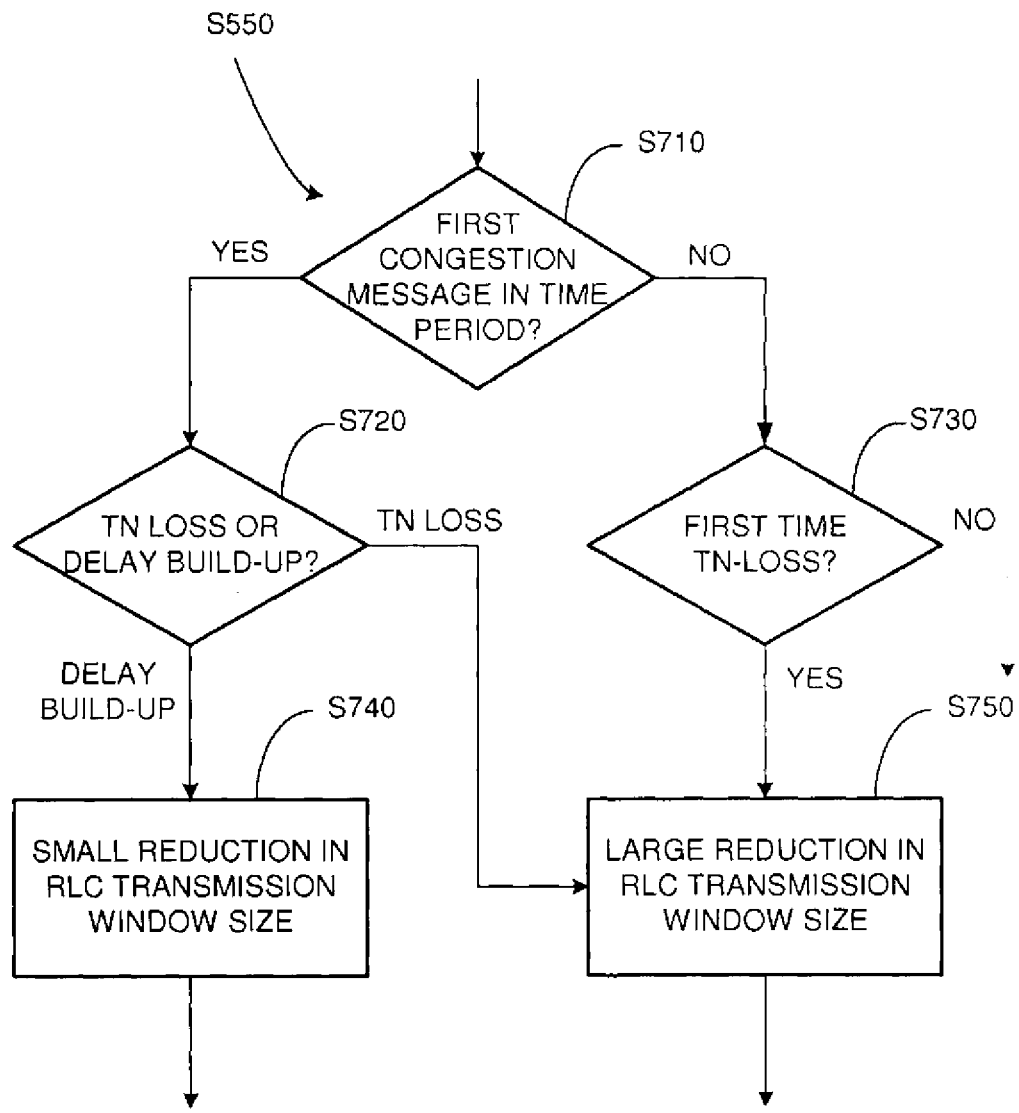

FIG. 12 illustrates an example embodiment of the Node-B arranged to implement the methods to detect congestion and to provide the congestion message to the RNC. The Node-B includes a processing unit 1210, a monitoring unit 1220, a storage unit 1230, and a communication unit 1240. The processing unit 1210 is arranged to control the overall operations of the RNC including coordinating and controlling the other units 1220-1240 to perform the methods.

The monitoring unit 1220 is arranged to monitor statuses of the Node-B including monitoring the data traffic conditions on communication link between the RNC and the Node-B (the Iub TN) and between the UE and the Node-B (Uu). The storage unit 1230 is arranged to store information necessary for proper functioning of the Node-B including storing data and control information for the data flow between the RNC and the UE. The storage unit 1230 can be used to buffer the MAC-d PDUs from the RNC and the UE to implement the protocol architecture. The communication unit 1240 is arranged to communicate with the UE and with the RNC.

The units 1210-1240 are illustrated as separate units in FIG. 12. However, this is merely to indicate that the functionalities are separated. The units can be provided as separate hardware devices. However, other configurations are possible. Any combination of the units can be implemented in any combination of software, hardware, and/or firmware.

The advantages of the one or more disclosed embodiments are numerous. The advantages include at least the following:

- The proposed solution(s) can be implemented in the existing architecture. In the existing architecture, there is a control frame for signaling congestion from Node-B to RNC. In an aspect, only the RLC entity in the RNC need to be modified or extended. The RLC entity in the UE need not be modified from the existing architecture.
- The proposed solution(s) provide transport network independent congestion control. Only the congestion detection method depends on the applied Iub TN solution (ATM or IP transport network).
- The window based solution makes the flow-control more efficient than the existing Iub FC. The difference is pronounced in cases of chancing bottleneck capacity.
- There is no need for a separate Uu control congestion (Iub and Uu).
- The handling of the Uu and Iub congestion can be optimized separately (keeping the existing Uu part).

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method for operating a radio network controller (RNC) in a wireless network, the RNC being in communication with a user equipment (UE), the method comprising:
   setting a radio link control (RLC) transmission window size for a flow associated with the UE at initial flow set up;
   determining whether a congestion message is received from the Node-B; and
   reducing the RLC transmission window size for the flow when it is determined that the congestion message is received from the Node-B, wherein the flow is a flow of Medium Access Control-d Protocol Data Units (MAC-d PDUs) formed from RLC PDUs exchanged between the RNC and the UE, and
   wherein the RLC transmission window size sets a maximum amount of outstanding data for the flow that can be transmitted from the RNC to the UE in one or more RLC PDUs until an acknowledgment (ACK) is received from the UE.

2. The method of claim 1, wherein the step of reducing the RLC transmission window size for the flow when it is determined the congestion message is received from the Node-B comprises:
   determining whether the congestion message is received for a first time within a predetermined time period; and
   reducing the RLC transmission window size for the flow when it is determined that the congestion message is received for the first time within the predetermined time period, wherein the predetermined time period is a time period since the initial flow set up or since an expiration of a previous measurement time period, whichever came last.

3. The method of claim 2, wherein the step of reducing the RLC transmission window size for the flow when it is determined that the congestion message is received for the first time within the predetermined time period comprises:
   determining whether the congestion message is: a delay build-up message indicating that the MAC-d PDUs for the flow buffered within the Node-B have accumulated by a predetermined threshold amount or greater, or a transport network (TN) loss message indicating that one or more MAC-d PDUs for the flow have been dropped;
   reducing the RLC transmission window size by a first reduction amount when it is determined that the congestion message is the delay build-up message; and reducing the RLC transmission window size by a second reduction amount when it is determined that the congestion message is the TN loss message,
wherein the first amount is less than the second amount.

4. The method of claim 2, wherein the step of reducing the RLC transmission window size for the flow when it is determined that the congestion message is received for the first time within the predetermined time period comprises:
   determining whether a data rate information included in the congestion message indicates that the RLC transmission window size is too big; and
   reducing the RLC transmission window size for the flow when it is determined that the RLC transmission window size is too big.

5. The method of claim 1, further comprising:
   determining whether an RLC PDU acknowledgment (ACK) is received from the UE of previously sent RLC PDUs from the RNC; and
   increasing the RLC transmission window size when it is determined that the RLC PDU ACK is received from the Node-B.

6. The method of claim 5, further comprising:
- determining whether a predetermined amount of time has passed since the initial flow set up or since an expiration of a previous measurement time period, whichever came last; and
- increasing the RLC transmission window size when it is determined that the predetermined determined amount of time has passed.

7. A radio network controller (RNC) in a wireless network, comprising: a communication unit arranged to exchange RLC PDUs with a UE via a Node-B over a Iub TN;
- a monitoring unit arranged to monitor data traffic conditions on communication links between the RNC and the Node-B;
- a storage unit arranged to store data and control information for a flow between the RNC and the UE; and
- a processing unit arranged to control the communication unit, the monitoring unit, and the storage unit to perform communication operations for the RNC, wherein the processing unit is arranged to:
- set a radio link control (RLC) transmission window size for the flow associated with the UE at initial flow set up;
- determine whether a congestion message is received from the Node-B; and reduce the RLC transmission window size for the flow when it is determined that the congestion message is received from the Node-B,
- wherein the RLC transmission window size reduction event includes a congestion event related to the flow,
- wherein the flow is a flow of Medium Access Control-d Protocol Data Units (MAC-d PDUs) formed from RLC PDUs exchanged between the RNC and the UE, and
- wherein the RLC transmission window size sets a maximum amount of outstanding data for the flow that can be transmitted from the RNC to the UE in one or more RLC PDUs until an acknowledgment (ACK) is received from the UE.

8. The RNC of claim 7, wherein the processing unit is arranged to reduce the RLC transmission window size when the congestion message is received by:
- determining whether the congestion message is received for a first time within a predetermined time period; and
- reducing the RLC transmission window size for the flow when it is determined that the congestion message is received for the first time within the predetermined time period,
- wherein the predetermined time period is a time period since the initial flow set up or since an expiration of a previous measurement time period, whichever came last.

9. The RNC of claim 8, wherein the processing unit is arranged to reduce the RLC transmission window size when it is determined that the congestion message is received for the first time within the predetermined time period by:
- determining whether the congestion message is: a delay build-up message indicating that the MAC-d PDUs for the flow buffered within the Node B have accumulated by a predetermined threshold amount or greater, or a transport network (TN) loss message indicating that one or more MAC-d PDUs for the flow have been dropped;
- reducing the RLC transmission window size by a first reduction amount when it is determined that the congestion message is the delay build-up message; and reducing the RLC transmission window size by a second reduction amount when it is determined that the congestion message is the TN loss message, wherein the first amount is less than the second amount.

10. The RNC of claim 8, wherein the processing unit is further arranged to:
- determine whether a RLC PDU acknowledgment (ACK) is received from the UE of previously sent RLC PDUs from the RNC;
- determine whether a predetermined amount of time has passed since the initial flow set up or since an expiration of a previous measurement time period, whichever came last; and
- increase the RLC transmission window size when it is determined that the RLC PDU ACK is received from the Node-B or that the predetermined amount of time has passed.

* * * * *

UNITED STATES PATENT AND TRADEMARK OFFICE
CERTIFICATE OF CORRECTION

PATENT NO. : 8,369,221 B2
APPLICATION NO. : 12/740499
DATED : February 5, 2013
INVENTOR(S) : Rácz et al.

Page 1 of 2

It is certified that error appears in the above-identified patent and that said Letters Patent is hereby corrected as shown below:

On the Title Page

Item (12), under "United States Patent", in Column 1, Line 1, delete "Racz et al." and insert -- Rácz et al. --, therefor.

Item (75), under "Inventors", in Column 1, Line 1, delete "Sandor Racz, Cegled" and insert -- Sándor Rácz, Cegléd --, therefor.

Item (75), under "Inventors", in Column 1, Line 1, delete "Zoltan C." and insert -- Zoltán C. --, therefor.

Item (75), under "Inventors", in Column 1, Line 2, delete "Nadas," and insert -- Nádas, --, therefor.

Item (75), under "Inventors", in Column 1, Line 4, delete "Skarholmen" and insert -- Skärholmen --, therefor.

In the Drawings

Delete Drawing sheet 1, and substitute therefor the Drawing sheet, consisting of FIG. 7A, as shown on the attached page.

In the Claims

In Column 13, Line 11, in Claim 7, delete "lub" and insert -- Iub --, therefor.

Signed and Sealed this
First Day of October, 2013

Teresa Stanek Rea
*Deputy Director of the United States Patent and Trademark Office*